United States Patent Office 2,882,205
Patented Apr. 14, 1959

2,882,205

OXYGENATION OF STEROIDS IN THE 11β POSITION BY CHAETOMELLA

Joseph L. Sardinas, Brooklyn, N.Y., John B. Routien, Tenafly, N.J., and Gilbert M. Shull, Huntington Station, N.Y., assignors to Chas. Pfizer & Co., Inc., New York, N.Y., a corporation of Delaware No Drawing. Application January 23, 1957
Serial No. 635,602

7 Claims. (Cl. 195—51)

This invention is concerned with a method for the oxygenation of certain steroid compounds by means of selected cultures of microorganisms. In particular, it is concerned with the conversion of compound S (Reichstein's substance S) by biological oxygenation to compound F (Kendall's compound F).

The preparation of biologically active steroid compounds, such as cortisone and compound F, is fraught with many great difficulties. One of the most difficult problems is the introduction of oxygen atoms at essential positions in the steroid nucleus, particularly at the 11-position of this nucleus. Compound S or 11-desoxy-17-hydroxycorticosterone is available by known synthetic routes from various naturally occurring, relatively cheap, steroid starting materials, such as the vegetable-type steroid compounds. Compound F, on the other hand (17-hydroxycorticosterone or hydrocortisone), is considerably more difficult to obtain and is a very valuable compound, particularly useful in the treatment of rheumatoid arthritis and certain other conditions of the human body. Any process whereby compound S may be converted to compound F in good yield and without undue expense is of appreciable value to the pharmaceutical industry.

It has now been found that by contacting the steroid with the oxygenating activity of certain selected microorganisms, i.e. with the organisms themselves or with their intra- or extra-cellular enzymes, the selective 11-β-hydroxylation of steroid compounds may be accomplished. Among other reactions which may be accomplished is the conversion of compound S to compound F. In addition, 11-β-hydroxylation may be thus achieved on progesterone, 17-hydroxyprogesterone, pregnenolones, androstenedione, testosterone, desoxycorticosterone, a variety of pregnenes, androstenes, pregnanes and allopregnanes, 6-dehydroprogesterone, esters of the hydroxyl groups of these, etc.

The Chaetomella genus belongs to the order Sphaeropsidales or Phomales (depending upon the classification system used) of the class Fungi Imperfecti. Of particular value are strains of the species C. oblonga and C. raphigera. Other microorganisms from the genus may be selected for conducting the process of this invention by simple tests which will be described in more detail below. Many of these organisms are available in public culture collections and others may be isolated from natural materials, such as soil, by standard procedures well known to mycologists.

As indicated above, the process of the present invention may be used for the 11-β-oxygenation of a variety of steroid compounds which are unsubstituted in the 11-position of the nucleus. Various side chains may be present at the 17-position of the nucleus and keto or hydroxyl or ester groups may be present. The steroid compounds used as substrates for the reaction may also bear carbon to carbon double bonds at various points of the nucleus, such as at the 3,4- or 5,6-position. It should be realized that the yield of oxygenated product will vary somewhat with the nature of the steroid compound used as starting material, with the particular microorganism employed, and with the conditions used for the reaction, that is, the temperature, time, pH, nutrient medium and so forth. Various methods may be used in the evaluation of the products produced by these processes. For instance, if a steroid compound with a suitable side chain is used, the proportion of the product produced may be evaluated by determination of the effect on adrenalectomized mice or upon the eosinophil count of experimental animals. Furthermore, the pure products produced by the hydroxylation reaction may be isolated as described below.

The effectiveness of a chosen microorganism for the process of this invention may be determined by cultivating the organism in a suitable nutrient medium containing carbohydrates, salts, sources of organic nitrogen and so forth. The steroid compound as a solid or as a solution in a suitable solvent, for example, acetone or ethanol, is added to the cultivated microorganism under sterile conditions and the mixture is agitated and aerated in order to bring about the growth of the microorganism and oxygenation of the steroid substrate. The steroid may be added when the medium is seeded under sterile conditions with a culture of the microorganism or after growth of the organism is established. The acetate of a steroid or other suitable ester may be used in place of the alcohol itself, although this may sometimes lead to an appreciably lowered yield of hydroxylated product. Alternatively, enzyme preparations from the growth of a suitable oxygenating organism of the genus may be used for conducting the process. These may be either extra- or intracellular enzyme preparations and can be obtained from the growing microorganism by methods familiar to enzyme chemists.

In general a concentration of not greater than one to two percent by weight of the total weight of substrate, for instance the compound S-type material, is used in conducting this process. Lower concentrations may be found to be more favorable. Since the solubility of the starting material in water is quite limited, an excess of the material may be slowly converted to the oxygenated product.

After completion of the oxygenation process, the product may be recovered from the mixture by extraction with a suitable water-immiscible solvent. Chlorinated lower hydrocarbons, ketones, and alcohols are useful. These include chloroform, methylene chloride, trichloroethane and so forth. The extract of product and unreacted starting material may be concentrated to a small volume or to dryness to obtain a solid product. Purification of the product may be accomplished in several ways. Most useful is the separation by means of chromatography of the product from starting material and from other products such as more highly oxygenated materials that may be formed during the reaction. Adsorbents such as silica gel or other suitable adsorbent are particularly useful for this purpose. It has been found that a column prepared from a mixture of silica gel and a small amount of a lower alcohol, especially ethanol, is particularly useful for the separation of the steroid starting materials. The materials may be separated and the separated compounds gradually eluted from the column by utilization of a mixture of solvents of gradually increasing polarity; for instance, a mixture of methylene chloride and a minor, gradually increasing amount of ethanol is very useful.

Fractions of the eluted material from chromatographic columns may be checked for the nature of the product by subjecting small portions of the solutions to chromatography on paper. Methods which are particularly useful for conducting this type of separation and analysis are:

described in detail in U.S. Patent 2,602,769, issued on July 8, 1952, to H. C. Murray et al., and in a publication by Shull et al. in the Archives of Biochemistry, vol. 37, p. 186 (1952). This method is also very useful for evaluating new strains of microorganisms to determine their usefulness in the process of this invention. The fermentation may be conducted on a small scale with the steroid as the substrate and the whole extract of the fermentation mixture may be concentrated and subjected to paper chromatography. By utilizing known samples of the steroid, e.g. compound S, compound F and other related products for comparison, it is possible to determine whether the chosen microorganism is suitable for the present process.

After separation of the reaction products by column chromatography, the desired fractions may be combined and concentrated to a small volume. The product may then be crystallized from a suitable solvent such as ethyl acetate. One product prepared by application of the present process has been compared with samples of authentic compound F and has been found to be identical in all respects.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

*Example I*

A culture of *Chaetomella oblonga* was propagated on an agar nutrient medium. The organism was rinsed from the agar slant under sterile conditions into a sterile medium having the following composition:

|  | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water, adjusted to pH 7.0 with potassium hydroxide.

One hundred milliliters of this medium were used in each of several three hundred-milliliter flasks. To each flask was added 50 milligrams of compound S dissolved in a small volume of acetone. Throughout these operations the fermentation mixture was maintained under aseptic conditions. The mixture was then shaken for a period of seven days at a temperature of about 28° C. The contents of the flasks were combined and extracted with several portions of methylene chloride using one-fifth the volume of the aqueous phase each time. The combined methylene chloride extracts were dried over anhydrous sodium sulfate and, after the drying agent was removed, the solvent was removed under vacuum. The solution was concentrated to 1–2 milliliters volume and a sample of this solution was subjected to paper chromatography using a system of solvents containing 50% by volume ether and 50% by volume hexane and a second system using a water-benzene mixture. Formamide impregnated paper with chloroform as the mobile phase is also useful. It was demonstrated that the product contains compound F by running paper chromatograms with a sample of authentic compound F as a control.

The methylene chloride concentrate was placed on a chromatographic column consisting of silica gel mixed with a small volume of ethanol (one milliliter of solvent per gram of silica gel). The column was developed by means of a mixture of 97 volumes of methylene chloride and three volumes of 95% ethanol. The effluent from the column was collected in small fractions of equal volume and periodically these were examined by means of paper chromatography in order to separate the fractions containing the desired product. All of these fractions were combined and concentrated under vacuum to dryness to obtain the solid product. This was proved to be compound F by comparing with a known sample of the same material.

*Example II*

A culture designated as *Chaetomella raphigera* was cultivated on agar nutrient medium. The growth of organism was then rinsed under aseptic conditions into a flask containing a nutrient medium similar to that given in Example I above. The microorganism was then cultivated in the presence of compound S just as described above. The product again was found to contain a substantial proportion of compound F indicating the selective β-hydroxylation of the 11-position of the steroid nucleus. The product was analyzed by means of paper chromatography and separated by means of chromatography on a column of silica gel.

*Example III*

A culture of *Chaetomella oblonga* was grown as described in Example I above, except that desoxycorticosterone was used in place of compound S. After the conclusion of the fermentation, the crude product was extracted by means of methyl isobutyl ketone and the solvent was then removed under vacuum. The residual product was tested for its activity in liver glycogen storage in adrenalectomized mice and the positive result showed the introduction of 11-β-hydroxyl in the steroid.

*Example IV*

Each of the organisms of Examples I and II was grown as described in Example I, except that in lieu of compound S the following steroid reactants containing 18 to 21 carbon atoms were employed:

Testosterone
Progesterone
6-dehydroprogesterone
Androstenedione
17-hydroxyprogesterone
3-keto-pregnane-20-ol
3-keto-allopregnane-20-ol
$\Delta^4$-pregnene-17α,21-diol-3,20-dione
$\Delta^{1,4}$-pregnadiene-17α-21-diol-3,20-dione In each instance the corresponding 11β-hydroxylated product was obtained, as expected.

A culture of the organism referred to above as *C. oblonga* is maintained in the culture collection of Chas. Pfizer & Co., Inc. under the number 1464–165A and has been deposited in the American Type Culture Collection under the number ATCC 12718. A culture of *C. raphigera* identified in the Pfizer collection as number 961–28P has been deposited in the American Type Culture Collection as ATCC 12719.

What is claimed is:

1. A process for the 11-β-hydroxylation of a steroid compound having a methylene group at the 11-position and containing 18 to 21 carbon atoms, which comprises contacting said steroid compound with the oxygenating activity of an organism chosen from the genus Chaetomella.

2. A process as claimed in claim 1 wherein the steroid compound is subjected to the action of a growing culture of the microorganism.

3. A process as claimed in claim 1 wherein the microorganism is cultivated aerobically in a nutrient medium until substantial growth is obtained, the mycelium is separated from the broth and the compound is contacted with an aqueous suspension of the mycelium.

4. A process for the conversion of compound S to compound F, which comprises contacting compound S with the oxygenating activity of an organism chosen from the genus Chaetomella.

5. The process of claim 4 wherein the organism is *Chaetomella oblonga*.

6. The process of claim 4 wherein the organism is *Chaetomella raphigera*.

7. A process for the preparation of compound F, which comprises cultivating an organism chosen from the genus Chaetomella in an aqueous nutrient medium under aerobic conditions until substantial growth is obtained, then separating the mycelium from the broth, and thereafter contacting compound S with an aqueous suspension of such mycelium.

References Cited in the file of this patent

UNITED STATES PATENTS

| | | |
|---|---|---|
| 2,695,260 | Murray et al. | Nov. 23, 1954 |
| 2,793,163 | Thoma | May 21, 1957 |